US011614103B2

(12) United States Patent
Onishi et al.

(10) Patent No.: US 11,614,103 B2
(45) Date of Patent: Mar. 28, 2023

(54) LANDING GEAR LIFTING/LOWERING EHA SYSTEM

(71) Applicant: SUMITOMO PRECISION PRODUCTS CO., LTD., Amagasaki (JP)

(72) Inventors: Takaaki Onishi, Amagasaki (JP); Shogo Hagihara, Amagasaki (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 59 days.

(21) Appl. No.: 17/435,675

(22) PCT Filed: Mar. 2, 2020

(86) PCT No.: PCT/JP2020/008625
§ 371 (c)(1),
(2) Date: Sep. 1, 2021

(87) PCT Pub. No.: WO2020/179725
PCT Pub. Date: Sep. 10, 2020

(65) Prior Publication Data
US 2022/0136532 A1 May 5, 2022

(30) Foreign Application Priority Data
Mar. 5, 2019 (JP) .............................. JP2019-039959

(51) Int. Cl.
*B64C 25/22* (2006.01)
*F15B 20/00* (2006.01)
(Continued)

(52) U.S. Cl.
CPC .............. *F15B 11/17* (2013.01); *B64C 25/22* (2013.01); *B64C 25/24* (2013.01); *F15B 15/18* (2013.01);
(Continued)

(58) Field of Classification Search
CPC .......... B64C 25/22; F15B 11/17; F15B 15/18; F15B 20/007; F15B 2211/6309; F15B 2211/6313
See application file for complete search history.

(56) References Cited

U.S. PATENT DOCUMENTS 9,422,052 B2 * 8/2016 Kondo .................. B64C 13/505
10,138,908 B2 * 11/2018 Vacca .................... F04C 15/008
(Continued)

FOREIGN PATENT DOCUMENTS

| JP | 2014-132189 A | 7/2014 |
| JP | 2016-150632 A | 8/2016 |

(Continued)

OTHER PUBLICATIONS

International Search Report for PCT/JP2020/08625 (ISA/JP) dated Apr. 7, 2020 with English translation (5 pages).

*Primary Examiner* — Michael Leslie
(74) *Attorney, Agent, or Firm* — Alston & Bird LLP

(57) ABSTRACT

A landing gear lifting/lowering EHA system includes: a hydraulic actuator configured to lift and lower the leg of an aircraft; at least one electrically operated hydraulic pump; a hydraulic path; a pressure sensor attached to the hydraulic actuator or the hydraulic path and configured to output a measurement signal corresponding to hydraulic pressure; and a controller configured to output a control signal to the electrically operated hydraulic pump, wherein, when a state in which the hydraulic pressure exceeds a set pressure continues for a set time, the control unit stops the electrically operated hydraulic pump in operation and resumes the operation of the electrically operated hydraulic pump after the hydraulic pressure drops to or below a second set pressure after the electrically operated hydraulic pump is stopped.

10 Claims, 8 Drawing Sheets

(51) Int. Cl.
  *F15B 11/17*   (2006.01)
  *B64C 25/24*   (2006.01)
  *F15B 15/18*   (2006.01)

(52) U.S. Cl.
  CPC ... *F15B 20/007* (2013.01); *F15B 2211/31582* (2013.01); *F15B 2211/31594* (2013.01); *F15B 2211/327* (2013.01); *F15B 2211/6309* (2013.01); *F15B 2211/6313* (2013.01); *F15B 2211/857* (2013.01); *F15B 2211/865* (2013.01)

(56) References Cited

U.S. PATENT DOCUMENTS

| | | | |
|---|---|---|---|
| 2014/0151501 A1 | 6/2014 | Kondo et al. | |
| 2014/0366522 A1* | 12/2014 | Masutani | F15B 15/18 60/477 |
| 2017/0233064 A1 | 8/2017 | McCormick et al. | |
| 2018/0002000 A1* | 1/2018 | Hagihara | F15B 11/04 |
| 2021/0381605 A1* | 12/2021 | Prathibha | F16K 3/265 |

FOREIGN PATENT DOCUMENTS

| | | |
|---|---|---|
| JP | 2018-94969 A | 6/2018 |
| WO | WO-2015/026850 A1 | 2/2015 |
| WO | WO-2015/026850 A9 | 2/2015 |
| WO | WO-2018/011975 A1 | 1/2018 |

\* cited by examiner

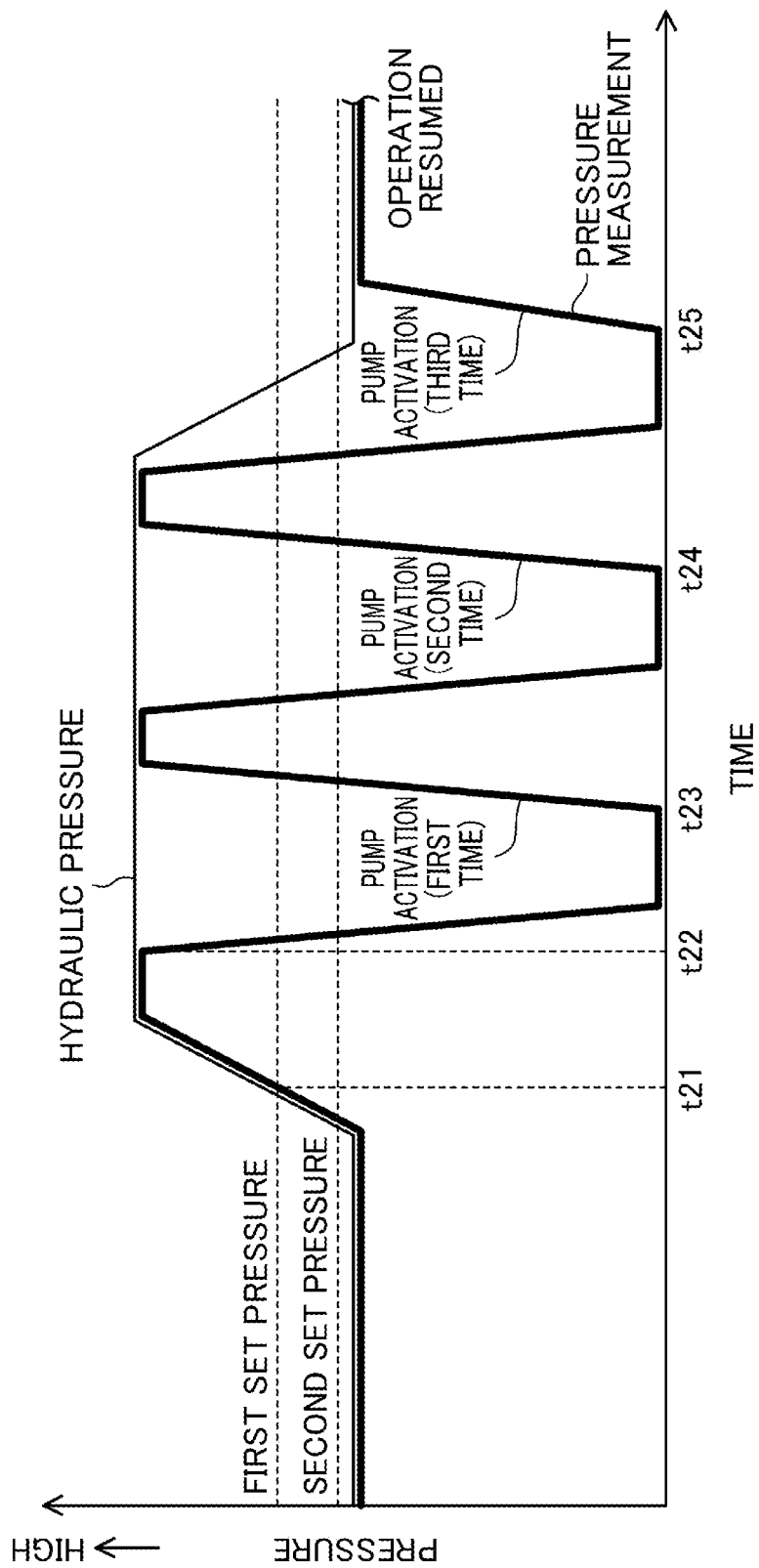

LANDING GEAR LIFTING/LOWERING EHA SYSTEM

CROSS REFERENCE TO RELATED APPLICATIONS

This application is a national stage application, filed under 35 U.S.C. § 371, of International Application No. PCT/JP2020/008625, filed Mar. 2, 2020, which claims priority to Japan Application No. 2019-039959, filed Mar. 5, 2019, the contents of both of which as are hereby incorporated by reference in their entirety.

BACKGROUND

Technical Field

The technique disclosed herein relates to an Electro Hydrostatic Actuator (EHA) system for lifting/lowering a leg of an aircraft.

Description of Related Art

Japanese Unexamined Patent Publication No. 2014-132189 teaches an EHA system for lifting/lowering a leg of an aircraft (hereinafter, referred to as landing gear lifting/lowering EHA system). The EHA system includes a hydraulic actuator and an electrically operated hydraulic pump. The electrically operated hydraulic pump supplies hydraulic fluid to the hydraulic actuator. With the hydraulic fluid supplied, the hydraulic actuator lifts or lowers the leg. With the EHA system, the need for a hydraulic system mounted in a traditional aircraft can be eliminated. The EHA system is advantageous in improving the fuel economy of the aircraft.

BRIEF SUMMARY

During lifting of the leg, the load of the hydraulic actuator may increase due to, for example, aerodynamic force acting on the leg. In the hydraulic system mounted on a traditional aircraft, it is possible to continuously supply hydraulic pressure to the hydraulic actuator even if the load of the hydraulic actuator for lifting/lowering the leg increases. In the EHA system, however, if the hydraulic pump is continuously operated with a high load of the hydraulic actuator, the hydraulic pump may seize. On the other hand, there is a demand for quick completion of lifting the leg.

It is an object of the technique disclosed herein to provide a landing gear lifting/lowering EHA system which is capable of swiftly completing lifting of the leg, while suppressing the risk of seizure taking place in the electrically operated hydraulic pump.

The technique disclosed herein relates to a landing gear lifting/lowering EHA system. The landing gear lifting/lowering EHA system includes: a hydraulic actuator attached to a leg of an aircraft and configured to lift and lower the leg; at least one electrically operated hydraulic pump configured to supply a hydraulic fluid to the hydraulic actuator at a time of lifting or lowering the leg; a hydraulic path connecting the hydraulic actuator and the electrically operated hydraulic pump; a pressure sensor attached to the hydraulic actuator or the hydraulic path and configured to output a measurement signal corresponding to a hydraulic pressure; and a control unit configured to receive the measurement signal and output, to the electrically operated hydraulic pump, a control signal based on the hydraulic pressure.

When a state in which the hydraulic pressure exceeds a set pressure continues for a set time while the leg is being lifted, the control unit stops the electrically operated hydraulic pump in operation and resumes the operation of the electrically operated hydraulic pump after the hydraulic pressure drops to or below a second set pressure after the electrically operated hydraulic pump is stopped.

With this configuration, the control unit stops the electrically operated hydraulic pump if a specific stop condition is satisfied during the lifting of the leg, thus suppressing the risk of seizure taking place in the electrically operated hydraulic pump. Further, when a specific resume condition is satisfied, the control unit resumes the operation of the electrically operated hydraulic pump to resume lifting of the leg, so that the lifting of the leg is swiftly completed.

The second set pressure may be the same as the set pressure related to stopping of the electrically operated hydraulic pump. The second set pressure may be set lower than the set pressure. The second set pressure lower than the set pressure stably resumes operation of the electrically operated hydraulic pump.

The control unit may stop the electrically operated hydraulic pump in operation when a state in which the revolution speed of the electrically operated hydraulic pump is not more than a set revolution speed and the hydraulic pressure exceeds the set pressure continues for the set time.

The electrically operated hydraulic pump is likely to seize if a state of a low flow rate and a high pressure continues. When the state of the hydraulic pump with a low flow rate and a high pressure continues, the control unit stops the electrically operated hydraulic pump, thereby more appropriately suppressing the risk of seizure taking place in the electrically operated hydraulic pump.

The landing gear lifting/lowering EHA system may further include a check valve arranged in the hydraulic path and configured to stop backflow of the hydraulic fluid to the electrically operated hydraulic pump.

In this way, when the electrically operated hydraulic pump stops during lifting of the leg, the leg is held and not lowered.

The pressure sensor may be arranged at the hydraulic actuator or between the hydraulic actuator and the check valve. While the electrically operated hydraulic pump is stopped, the control unit may determine that the hydraulic pressure has dropped to or below the second set pressure based on the measurement signal.

In this way, while the electrically operated hydraulic pump is stopped, the control unit is able to measure the hydraulic pressure of the hydraulic actuator based on the measurement signal from the pressure sensor.

The pressure sensor may be arranged between the check valve and the electrically operated hydraulic pump. While the electrically operated hydraulic pump is stopped, the control unit may temporarily operate the electrically operated hydraulic pump and determine that the hydraulic pressure has dropped to or below the second set pressure based on the measurement signal obtained while the electrically operated hydraulic pump is temporarily operated.

Activating the electrically operated hydraulic pump opens the check valve, which allows the pressure sensor to output a measurement signal corresponding to the hydraulic pressure of the hydraulic actuator. Further, a short operating time of the electrically operated hydraulic pump suppresses the risk of seizure taking place in the electrically operated hydraulic pump at a time of measuring the hydraulic pressure of the hydraulic actuator.

The control unit may intermittently repeat temporary operation of the electrically operated hydraulic pump until the hydraulic pressure drops to or below the second set pressure.

Intermittently operating the electrically operated hydraulic pump suppresses the risk of seizure taking place in the electrically operated hydraulic pump. Further, by repeating the measurement of the hydraulic pressure, the control unit is able to swiftly determine that the hydraulic pressure has dropped to or below the second set pressure. By resuming the operation of the electrically operated hydraulic pump earlier, lifting of the leg is completed earlier.

The electrically operated hydraulic pump may include a first electrically operated hydraulic pump and a second electrically operated hydraulic pump. The hydraulic path may connect the first electrically operated hydraulic pump and the second electrically operated hydraulic pump in parallel with the hydraulic actuator. In the hydraulic path, a check valve may be arranged between a merging point of the first electrically operated hydraulic pump and the second electrically operated hydraulic pump and the first electrically operated hydraulic pump, and a second check valve may be arranged between the merging point and the second electrically operated hydraulic pump. While the leg is being lifted or lowered, the control unit may operate both or one of the first electrically operated hydraulic pump and the second electrically operated hydraulic pump.

This makes the EHA system redundant. In a normal state, both the first electrically operated hydraulic pump and the second electrically operated hydraulic pump may supply the hydraulic fluid to the hydraulic actuator. When one of the first electrically operated hydraulic pump or the second electrically operated hydraulic pump fails, the other one of the first electrically operated hydraulic pump or the second electrically operated hydraulic pump is able to supply the hydraulic fluid to the hydraulic actuator. When the one electrically operated hydraulic pump is operating, the check valve stops backflow of the hydraulic fluid to the other electrically operated hydraulic pump. Further, as hereinabove described, the check valve holds the leg even if the electrically operated hydraulic pump stops while the leg is being lifted.

The pressure sensor may be arranged at the hydraulic actuator or between the hydraulic actuator and the merging point. Second pressure sensors may be arranged between the first electrically operated hydraulic pump and the check valve and between the second electrically operated hydraulic pump and the second check valve, respectively. While the electrically operated hydraulic pump is operated, the control unit may determine that the hydraulic pressure has exceeded the set pressure based on measurement signals from the second pressure sensors, and while the electrically operated hydraulic pump is stopped, the control unit may determine that the hydraulic pressure has dropped to or below the second set pressure based on the measurement signal from the pressure sensor.

While the electrically operated hydraulic pump is operating, the two second pressure sensors can output measurement signals corresponding to output pressures (and the hydraulic pressure of the hydraulic actuator) of the first electrically operated hydraulic pump and the second electrically operated hydraulic pump, respectively. While the electrically operated hydraulic pump is stopped, the pressure sensor can output the measurement signal corresponding to the hydraulic pressure of the hydraulic actuator.

The pressure sensors may be arranged between the first electrically operated hydraulic pump and the check valve and between the second electrically operated hydraulic pump and the second check valve, respectively. While the electrically operated hydraulic pump is operated, the control unit may determine that the hydraulic pressure has exceeded the set pressure based on the measurement signal, and while the electrically operated hydraulic pump is stopped, the control unit may temporarily operate the electrically operated hydraulic pump and determine that the hydraulic pressure has dropped to or below the second set pressure based on the measurement signal obtained while the electrically operated hydraulic pump is temporarily operated.

Activating the first electrically operated hydraulic pump and/or the second electrically operated hydraulic pump opens the check valve and/or the second check valve, which allows the pressure sensor to output a measurement signal corresponding to the hydraulic pressure of the hydraulic actuator. This also suppresses the risk of seizure taking place in the electrically operated hydraulic pump at a time of measuring the hydraulic pressure of the hydraulic actuator. Further, this configuration requires a fewer sensors in the EHA system because a single pressure sensor outputs the measurement signal while the electrically operated hydraulic pump is operated or stopped.

The control unit may intermittently repeat temporary operation of the electrically operated hydraulic pump until the hydraulic pressure drops to or below the second set pressure. The control unit alternately and temporarily operates the first electrically operated hydraulic pump and the second electrically operated hydraulic pump.

Alternately and intermittently operating the two electrically operated hydraulic pumps suppresses the risk of seizure taking place in the electrically operated hydraulic pump at a time of measuring the hydraulic pressure of the hydraulic actuator. Further, by alternately operating the two electrically operated hydraulic pumps, the downtime of the electrically operated hydraulic pump in the intermittent operation can be shortened. Since the hydraulic pressure is more frequently measured, the control unit is able to swiftly determine that the hydraulic pressure has dropped to or below the second set pressure. By resuming the operation of the electrically operated hydraulic pump earlier, lifting of the leg is completed earlier.

As described hereinabove, a landing gear lifting/lowering EHA system disclosed herein is capable of swiftly completing lifting of the leg, while suppressing the risk of seizure taking place in the electrically operated hydraulic pump.

BRIEF DESCRIPTION OF THE FIGURES

FIG. 8 is a diagram illustrating exemplary changes in a hydraulic pressure of the EHA system and the measured pressure of the pressure sensor.

DETAILED DESCRIPTION OF VARIOUS EMBODIMENTS

Figure 1:
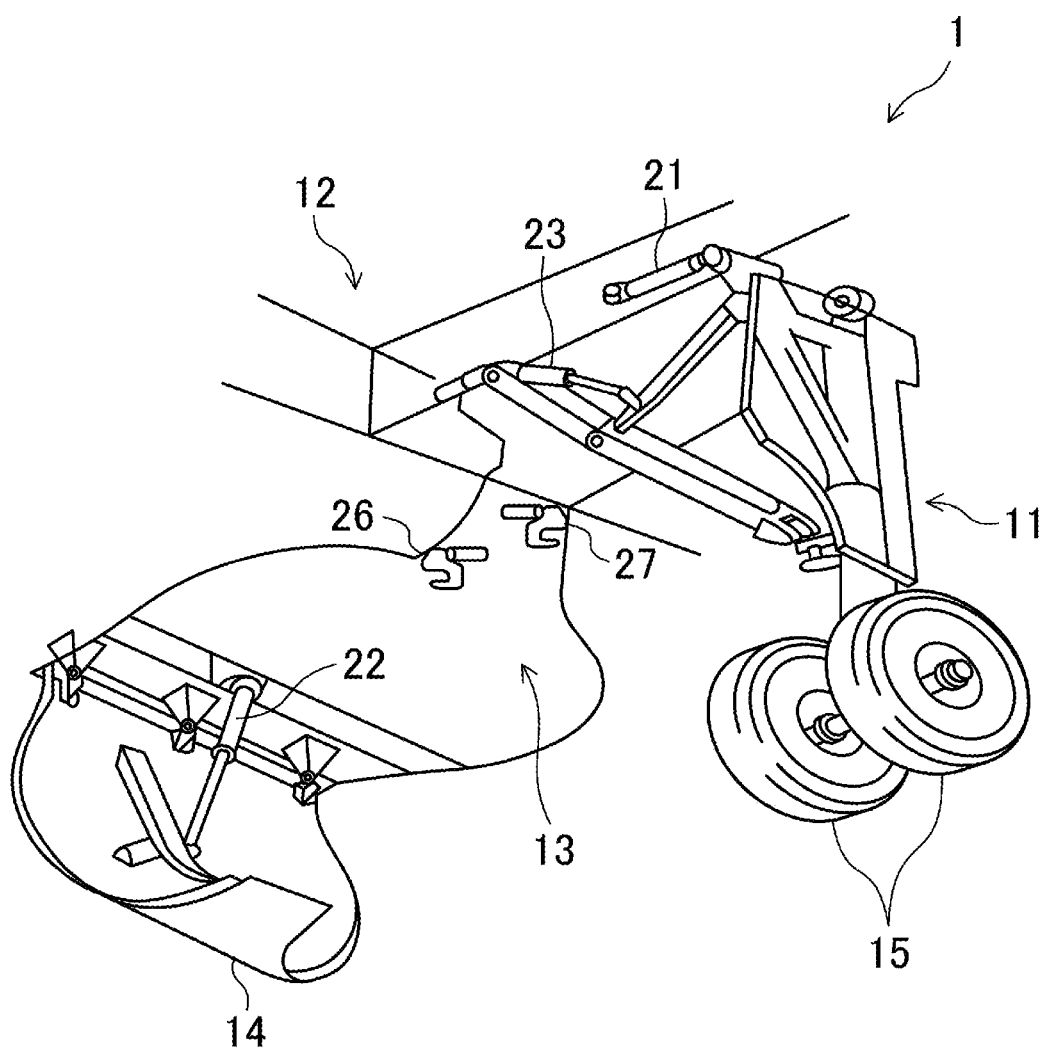
FIG. 1 is a perspective view illustrating a landing gear of an aircraft.

An embodiment of an electro-hydrostatic actuator (EHA) system for lifting/lowering a leg of an aircraft (hereinafter, referred to as landing gear lifting/lowering EHA system) will now be described with reference to the drawings. The EHA system described below is an example. FIG. 1 is a perspective view illustrating a landing gear 1 of an aircraft. The landing gear 1 is a main leg.

The landing gear 1 retracts the leg 11 in an airframe 12 and deploys the leg 11 from the airframe 12. A wheel 15 is attached at a distal end of the leg 11. The landing gear 1 includes a gear cylinder 21, a door cylinder 22, a down-lock release cylinder 23, a door up-lock release cylinder 26, and a gear up-lock release cylinder 27.

The gear cylinder 21 lifts and lowers the leg 11. The door cylinder 22 opens and closes a door 14 of a landing gear bay 13. The landing gear bay 13 accommodates therein the leg 11. The down-lock release cylinder 23 releases a down-lock mechanism configured to fix a leg-lowered state. The door up-lock release cylinder 26 releases a door up-lock mechanism configured to fix the door in a raised state. The gear up-lock release cylinder 27 releases a gear up-lock mechanism configured to fix the leg 11 in a raised state. Each of the cylinders 21, 22, 23, 26 and 27 is a double-acting hydraulic cylinder. Each of the cylinders 21, 22, 23, 26, and 27 is an example of a hydraulic actuator. The landing gear 1 may have only some of these cylinders.

(Configuration of EHA System)

Figure 2:
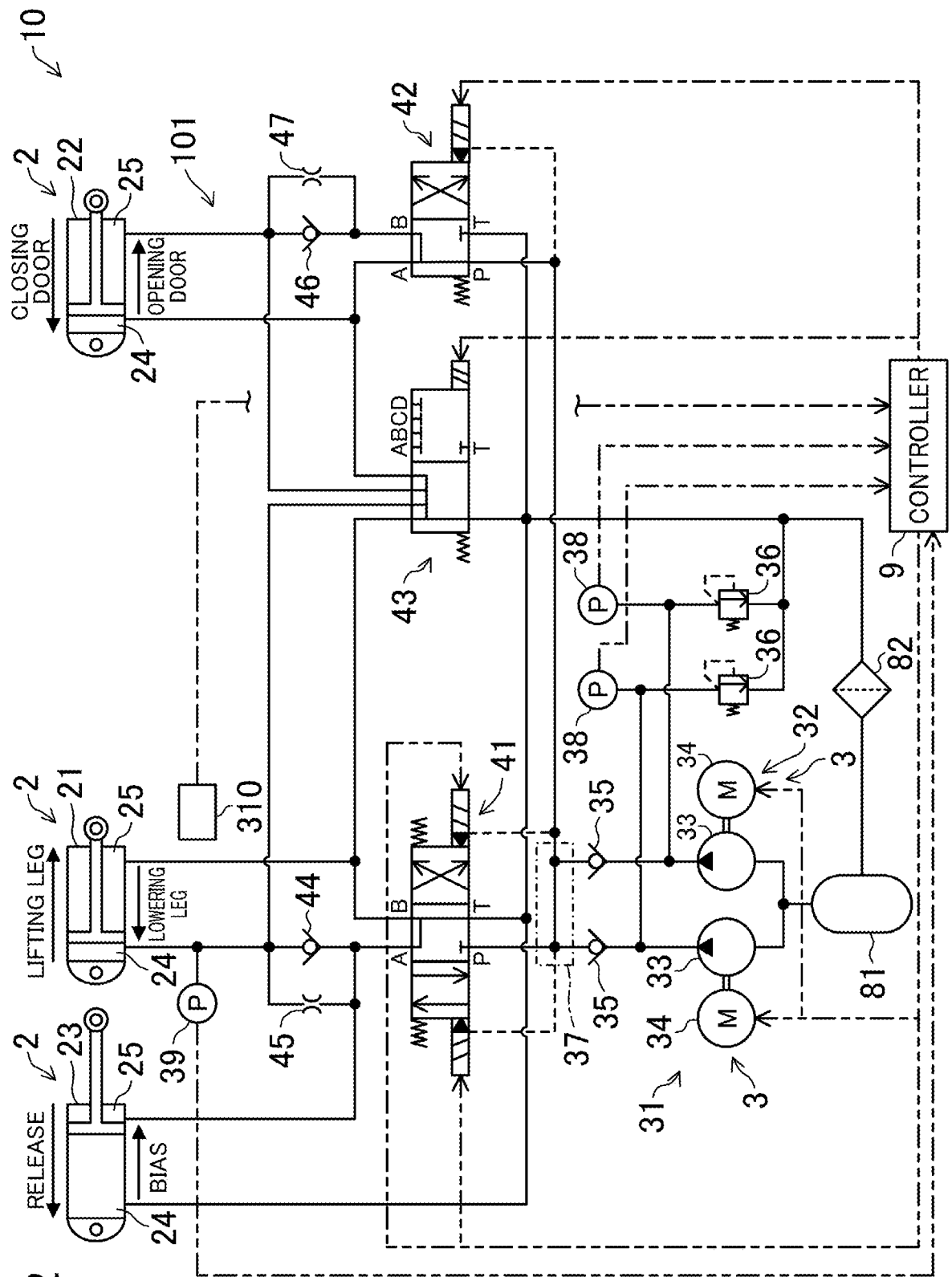
FIG. 2 is a circuit diagram illustrating a landing gear lifting/lowering EHA system.

FIG. 2 is a circuit diagram illustrating a configuration of the EHA system 10 for the landing gear 1. The EHA system 10 of FIG. 2 includes the gear cylinder 21, the door cylinder 22, and the down-lock release cylinder 23 as mentioned hereinabove. The EHA system 10 may include the door up-lock release cylinder 26 and the gear up-lock release cylinder 27. The EHA system 10 may include only some of the cylinders 21, 22, 23, 26, and 27. In the following description, the gear cylinder 21, the door cylinder 22, and the down-lock release cylinder 23 are collectively referred to as a hydraulic cylinder 2. It should be noted that, in FIG. 2, each continuous line indicates a hydraulic path 101, each broken line indicates a pilot hydraulic path, and each alternate long and short dashed line indicates an electric signal pathway.

The hydraulic cylinder 2 has a bore-shaped fluid chamber 24 and an annulus-shaped fluid chamber 25. Inside each cylinder, a piston head separates the bore-shaped fluid chamber 24 and the annulus-shaped fluid chamber 25 from each other. A first port of the hydraulic cylinder 2 communicates with the bore-shaped fluid chamber 24, and a second port communicates with the annulus-shaped fluid chamber 25. The hydraulic fluid flows into and out from the bore-shaped fluid chamber 24 through the first port, and flows into and out from the annulus-shaped fluid chamber 25 through the second port.

In the exemplary configuration of FIG. 2, the gear cylinder 21 lifts the leg 11 against a load when extending, and releases the load and lowers the leg 11 when contracting. In the exemplary configuration of FIG. 2, the door cylinder 22 releases a load and opens the door when extending, and closes the door against the load when contracting. In the exemplary configuration of FIG. 2, a biasing member (not shown) applies a load to the down-lock release cylinder 23 in an extending direction. Contraction of the down-lock release cylinder 23 releases the mechanism configured to fix a leg-lowered state. It should be noted that the configurations of the gear cylinder 21, the door cylinder 22, and the down-lock release cylinder 23 are not limited to the above.

The EHA system 10 includes two electrically operated hydraulic pumps that are a first electrically operated hydraulic pump 31 and a second electrically operated hydraulic pump 32. The first electrically operated hydraulic pump 31 and the second electrically operated hydraulic pump 32 supply hydraulic fluid to corresponding one of hydraulic cylinders 2. The first electrically operated hydraulic pump 31 and the second electrically operated hydraulic pump 32 are provided in parallel with the hydraulic cylinders 2. In the following description, the first electrically operated hydraulic pump 31 and the second electrically operated hydraulic pump 32 are collectively referred to as an electrically operated hydraulic pump 3 if these pumps are not distinguished from each other.

The first electrically operated hydraulic pump 31 includes a single hydraulic pump 33 and a single electric motor 34. The hydraulic pump 33 and the electric motor 34 are connected to each other. The second electrically operated hydraulic pump 32 also includes a single hydraulic pump 33 and a single electric motor 34. The hydraulic pump 33 and the electric motor 34 are connected to each other. The hydraulic pump 33 is a pump of a one-way rotation type that is rotatable only in one direction. The hydraulic pump 33 may be, for example, a gear pump. However, the type of the hydraulic pump 33 is not limited to this. The electric motor 34 is activated, operated, and stopped, in response to control signals received from a later-described controller 9.

Between a merging point 37 of the first electrically operated hydraulic pump 31 and the second electrically operated hydraulic pump 32 and the hydraulic pump 33 of the first electrically operated hydraulic pump 31, a check valve 35 is arranged. The check valve 35 (i.e., a second check valve) is also arranged between the merging point 37 and the hydraulic pump 33 of the second electrically operated hydraulic pump 32. As will be described later, when one of the first and second electrically operated hydraulic pumps 31 and 32 fails and stops, the check valve 35 stops backflow of the hydraulic fluid discharged from the other electrically operated hydraulic pump 3 to the electrically operated hydraulic pump 3.

The hydraulic path 101 at the downstream of the first electrically operated hydraulic pump 31 is branched off. The branched path is connected to a reservoir 81 via a relief valve 36 and a filter 82. Similarly, the hydraulic path 101 at the downstream of the second electrically operated hydraulic pump 32 is branched off. The branched path is connected to a reservoir 81 via a relief valve 36 and a filter 82. The reservoir 81 absorbs fluctuation in the total volume of the bore-shaped fluid chamber 24 and the annulus-shaped fluid chamber 25 of the hydraulic cylinder 2 associated with expansion and contraction of the hydraulic cylinder 2. The reservoir 81 is connected to an inlet port of the first electrically operated hydraulic pump 31 and an inlet port of the second electrically operated hydraulic pump 32.

The merging point 37 of the first electrically operated hydraulic pump 31 and the second electrically operated hydraulic pump 32 is connected to a gear selector valve 41 and a door selector valve 42.

The gear selector valve 41 is a four-port-three-position switching valve having four ports that are a P port, a T port, an A port, and a B port. The gear selector valve 41 selectively supplies hydraulic fluid to the gear cylinder 21 and the down-lock release cylinder 23. The P port is connected to the merging point 37 of the first electrically operated hydraulic pump 31 and the second electrically operated hydraulic pump 32. The T port is connected to the reservoir 81. The A port is connected to the bore-shaped fluid chamber 24 of the gear cylinder 21 and the annulus-shaped fluid chamber 25 of the down-lock release cylinder 23. The B port is connected to the annulus-shaped fluid chamber 25 of the gear cylinder 21. Note that the bore-shaped fluid chamber 24 of the down-lock release cylinder 23 is connected to the reservoir 81.

The gear selector valve 41 is also a hydraulically piloting solenoid valve having a spool that moves under the pilot hydraulic pressure. The spool is biased to a center position by a spring. The gear selector valve 41, while being at the center position, communicates the A port and the B port with the T port. In a first offset position (i.e., a position on the left side in FIG. 2), the gear selector valve 41 communicates the A port with the P port and communicates the B port with the T port. In a second offset position (i.e., a position on the right side in FIG. 2), the gear selector valve 41 communicates the A port with the T port and communicates the B port with the T port. By switching the position of the gear selector valve 41, the controller 9 selectively supplies the hydraulic fluid to the bore-shaped fluid chamber 24 or the annulus-shaped fluid chamber 25 of the gear cylinder 21 and switches between supplying and stop supplying of the hydraulic fluid to the annulus-shaped fluid chamber 25 of the down-lock release cylinder 23.

Between the A port of the gear selector valve 41 and the bore-shaped fluid chamber 24 of the gear cylinder 21, a check valve 44 and an orifice 45 are arranged in parallel. The check valve 44 and the orifice 45 limit a contraction speed of the gear cylinder 21.

The door selector valve 42 is a four-port-two-position switching valve having four ports that are a P port, a T port, an A port, and a B port. The door selector valve 42 selectively supplies hydraulic fluid to the door cylinder 22. The P port is connected to the merging point 37 of the first electrically operated hydraulic pump 31 and the second electrically operated hydraulic pump 32. The T port is connected to the reservoir 81. The A port is connected to the bore-shaped fluid chamber 24 of the door cylinder 22. The B port is connected to the annulus-shaped fluid chamber 25 of the door cylinder 22.

The door selector valve 42 is also a hydraulically piloting solenoid valve having a spool that moves under the pilot hydraulic pressure. The spool is biased to a normal position by a spring. The door selector valve 42, while being at the normal position, communicates the A port and the B port with the P port. In an offset position, the door selector valve 42 communicates the A port with the T port and communicates the B port with the P port. By switching the position of the door selector valve 42, the controller 9 selectively supplies the hydraulic fluid to the bore-shaped fluid chamber 24 or the annulus-shaped fluid chamber 25 of the door cylinder 22.

Between the B port of the door selector valve 42 and the annulus-shaped fluid chamber 25 of the door cylinder 22, a check valve 46 and an orifice 47 are arranged in parallel. The check valve 46 and the orifice 47 limit an extending speed of the door cylinder 22.

Between the gear cylinder 21 and door cylinder 22 and the reservoir 81, a dump valve 43 is arranged. The dump valve 43 is a five-port-two-position switching valve having A, B, C, D ports and a T port. The A port of the dump valve 43 is connected to the annulus-shaped fluid chamber 25 of the gear cylinder 21. The B port is connected to the bore-shaped fluid chamber 24 of the gear cylinder 21. The C port is connected to the annulus-shaped fluid chamber 25 of the door cylinder 22. The D port is connected to the bore-shaped fluid chamber 24 of the door cylinder 22. The T port is connected to the reservoir 81.

The dump valve 43 is a solenoid valve having a spool that is directly driven by a solenoid. The spool is biased to a normal position by a spring. The dump valve 43, while being at the normal position, communicates all of the A, B, C, and D ports with the T port. In an offset position, the dump valve 43 disconnects the A to D ports from the T port. The controller 9 switches the dump valve 43.

At the above-described branched path of the first electrically operated hydraulic pump 31, a pressure sensor 38 is attached. The pressure sensor 38 outputs, to the controller 9, a measurement signal corresponding to the output pressure of the first electrically operated hydraulic pump 31. Further, a pressure sensor 38 is also attached at the branched path of the second electrically operated hydraulic pump 32. The pressure sensor 38 outputs, to the controller 9, a measurement signal corresponding to the output pressure of the second electrically operated hydraulic pump 32. With the two pressure sensors 38, the controller 9 can individually measure the output pressure of the first electrically operated hydraulic pump 31 and the output pressure of the second electrically operated hydraulic pump 32. These pressure sensors 38 are each an example of a second pressure sensor.

The EHA system 10 of FIG. 2 includes another pressure sensor 39. The pressure sensor 39 is attached to the hydraulic path 101 that connects the merging point 37 of the first electrically operated hydraulic pump 31 and the second electrically operated hydraulic pump 32 with the bore-shaped fluid chamber 24 of the gear cylinder 21. The pressure sensor 39 outputs, to the controller 9, a measurement signal corresponding to the pressure of the bore-shaped fluid chamber 24 of the gear cylinder 21. The pressure sensor 39 may be attached to the gear cylinder 21. Further, the reference character 310 in FIG. 2 denotes a sensor configured to sense completion of lifting the leg of the landing gear 1. The sensor 310 outputs a sensor signal to the controller 9.

(Operation of EHA System when Lifting Leg)

Next, the following describes an operation of the EHA system 10 at a time of lifting the leg. To retract the leg 11 in the airframe 12, the landing gear 1 first opens the door in a closed state, and then lifts the leg and closes the door after lifting of the leg is completed. Further, to deploy the leg 11 from the airframe 12, the landing gear 1 first opens the door in the closed state, and then lowers the leg and closes the door after lowering of the leg is completed.

The controller 9 outputs control signals to the first electrically operated hydraulic pump 31 and the second electrically operated hydraulic pump 32. The first electrically operated hydraulic pump 31 and the second electrically operated hydraulic pump 32 activate, operate, and stop in response to the control signals. The controller 9 also outputs control signals to the gear selector valve 41, the door selector valve 42, and the dump valve 43. Each of the gear selector valve 41, the door selector valve 42, and the dump valve 43 switches the position of its spool in response to the control signals. By outputting the control signals to the first electrically operated hydraulic pump 31, the second electrically operated hydraulic pump 32, the gear selector valve 41, the door selector valve 42, and the dump valve 43, the controller 9 retracts the leg 11 in the airframe 12 or deploys the leg 11 from the airframe 12. The controller 9 is an example of a control unit.

Figure 3:
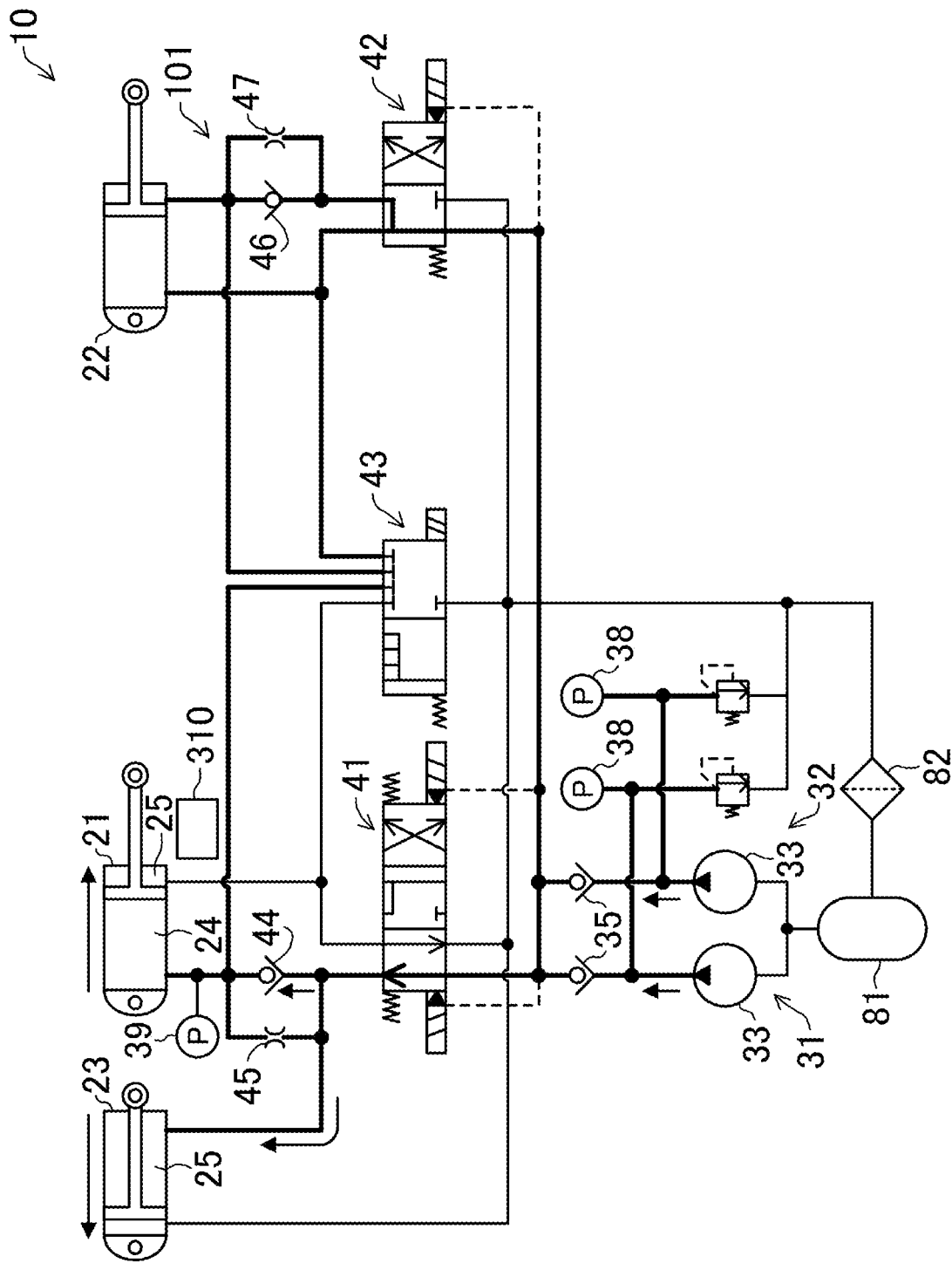
FIG. 3 is a diagram showing an operation when the EHA system of FIG. 2 lifts the leg.

FIG. 3 shows an operation of the EHA system 10 at a time of opening the door and lifting the leg. Note that FIG. 3 omits illustration of the controller 9, the electric motor 34, and the electric signal pathway. Further, in FIG. 3, the bold continuous line indicates a hydraulic path supplying the hydraulic fluid, the broken line indicates the pilot hydraulic path, and the continuous line indicates the hydraulic path 101 connected to the reservoir 81.

The controller 9 sets the gear selector valve 41 to the first offset position. This causes the A port and P port of the gear selector valve 41 to communicate with each other and the B port and the T port of the gear selector valve 41 to communicate with each other. Further, the controller 9 operates the first electrically operated hydraulic pump 31 and the second electrically operated hydraulic pump 32. Based on measurement signals from the two pressure sensors 38, the controller 9 performs feedback control for each of the first electrically operated hydraulic pump 31 and the second electrically operated hydraulic pump 32. The hydraulic fluid is supplied to the annulus-shaped fluid chamber 25 of the down-lock release cylinder 23 via the gear selector valve 41 as indicated by the arrow mark of the figure. The down-lock release cylinder 23 contracts as indicated by the arrow mark of FIG. 3. The mechanism for fixing the leg-lowered state is released. Further, the hydraulic fluid is supplied to the bore-shaped fluid chamber 24 of the gear cylinder 21 via the check valve 44. The gear cylinder 21 extends as indicated by the arrow mark of FIG. 3. As a result, the leg 11 is lifted. Note that the hydraulic fluid discharged from the annulus-shaped fluid chamber 25 due to extension of the gear cylinder 21 returns to the reservoir 81 via the gear selector valve 41 and the filter 82. The controller 9 determines that the lifting of the leg is completed based on the detection signal from the sensor 310.

Note that, when one of the first electrically operated hydraulic pump 31 or the second electrically operated hydraulic pump 32 fails, the controller 9 operates only the other electrically operated hydraulic pump 3. The EHA system 10 is made redundant by providing the first electrically operated hydraulic pump 31 and the second electrically operated hydraulic pump 32 in parallel with the hydraulic cylinders 2. Therefore, the hydraulic fluid can be supplied to each of the hydraulic cylinders 2 only with a single electrically operated hydraulic pump 3.

(Control for Suppressing Risk of Seizure Taking Place in Electrically Operated Hydraulic Pump)

When lifting the leg 11, the load of the gear cylinder 21 may increase due to, for example, aerodynamic force acting on the leg 11. The thermal capacity of each hydraulic pump 33 of the EHA system 10 is small. Continuing the operation of the hydraulic pump 33 with a high load on the gear cylinder 21 may thus lead to seizure of the hydraulic pump 33. Particularly, the gear pump is easily seized when continuously operated with a low flow rate and a high pressure.

To address this, the controller 9 is configured to suppress the risk of seizure taking place in the hydraulic pump 33 at a time of lifting the leg. Specifically, while the leg is being lifted, the controller 9 determines whether a state in which the revolution speed of the hydraulic pump 33 is not more than a set revolution speed and the hydraulic pressure is over a first set pressure continues for a set time. The controller 9 may detect the revolution speed of the hydraulic pump 33 based on a control signal output to the electric motor 34. Further, a sensor configured to output, to the controller 9, a measurement signal corresponding to the revolution speed of the hydraulic pump 33 and/or the electric motor 34 may be attached to the hydraulic pump 33 and/or the electric motor 34. The controller 9 may detect the hydraulic pressure of the bore-shaped fluid chamber 24 of the gear cylinder 21 based on measurement signals from the two pressure sensors 38. Further, the controller 9 may detect the hydraulic pressure of the bore-shaped fluid chamber 24 of the gear cylinder 21 based on a measurement signal from the pressure sensor 39. When the state in which the revolution speed of the hydraulic pump 33 is not more than the set revolution speed and the hydraulic pressure is over the first set pressure continued for the set time, the controller 9 stops the first electrically operated hydraulic pump 31 and the second electrically operated hydraulic pump 32. Note that, the controller 9 may stop the first electrically operated hydraulic pump 31 and the second electrically operated hydraulic pump 32, when the state in which the hydraulic pressure of the EHA system 10 is over the first set pressure continued for the set time.

Between the gear cylinder 21 and first electrically operated hydraulic pump 31 and the second electrically operated hydraulic pump 32, check valves 35, 35 are arranged. The hydraulic fluid does not backflow while the leg is being lifted, even if the first electrically operated hydraulic pump 31 and the second electrically operated hydraulic pump 32 are stopped (see FIG. 3). The leg 11 in the middle of being lifted is held at that position. The leg 11 is not lowered. Resuming the operation of the electrically operated hydraulic pump 3 thus swiftly completes lifting of the leg.

The controller 9 activates the first electrically operated hydraulic pump 31 and the second electrically operated hydraulic pump 32 when the hydraulic pressure of the bore-shaped fluid chamber 24 of the gear cylinder 21 is lowered. Here, the check valves 35 are arranged between two pressure sensors 38 and the gear cylinder 21. Therefore, the two pressure sensors 38 cannot detect the hydraulic pressure of the bore-shaped fluid chamber 24 of the gear cylinder 21 while the first electrically operated hydraulic pump 31 and the second electrically operated hydraulic pump 32 are stopped. Therefore, while the first electrically operated hydraulic pump 31 and the second electrically operated hydraulic pump 32 are stopped, the controller 9 detects the hydraulic pressure of the bore-shaped fluid chamber 24 of the gear cylinder 21 based on a measurement signal from the pressure sensor 39. The controller 9 resumes operations of the first electrically operated hydraulic pump 31 and the second electrically operated hydraulic pump 32 when the hydraulic pressure of the bore-shaped fluid chamber 24 of the gear cylinder 21 drops to or below a second set pressure.

Here, the first set pressure may be such that seizure takes place when the hydraulic pump 33 continues to operate at the first set pressure for a long time. The first set pressure may be lower than a valve opening pressure of the relief valve 36. The second set pressure may be lower than the first set pressure. In this way, the operation of the electrically operated hydraulic pump 3 can be stably resumed. The second set pressure may be the same as the first set pressure.

Figure 4:
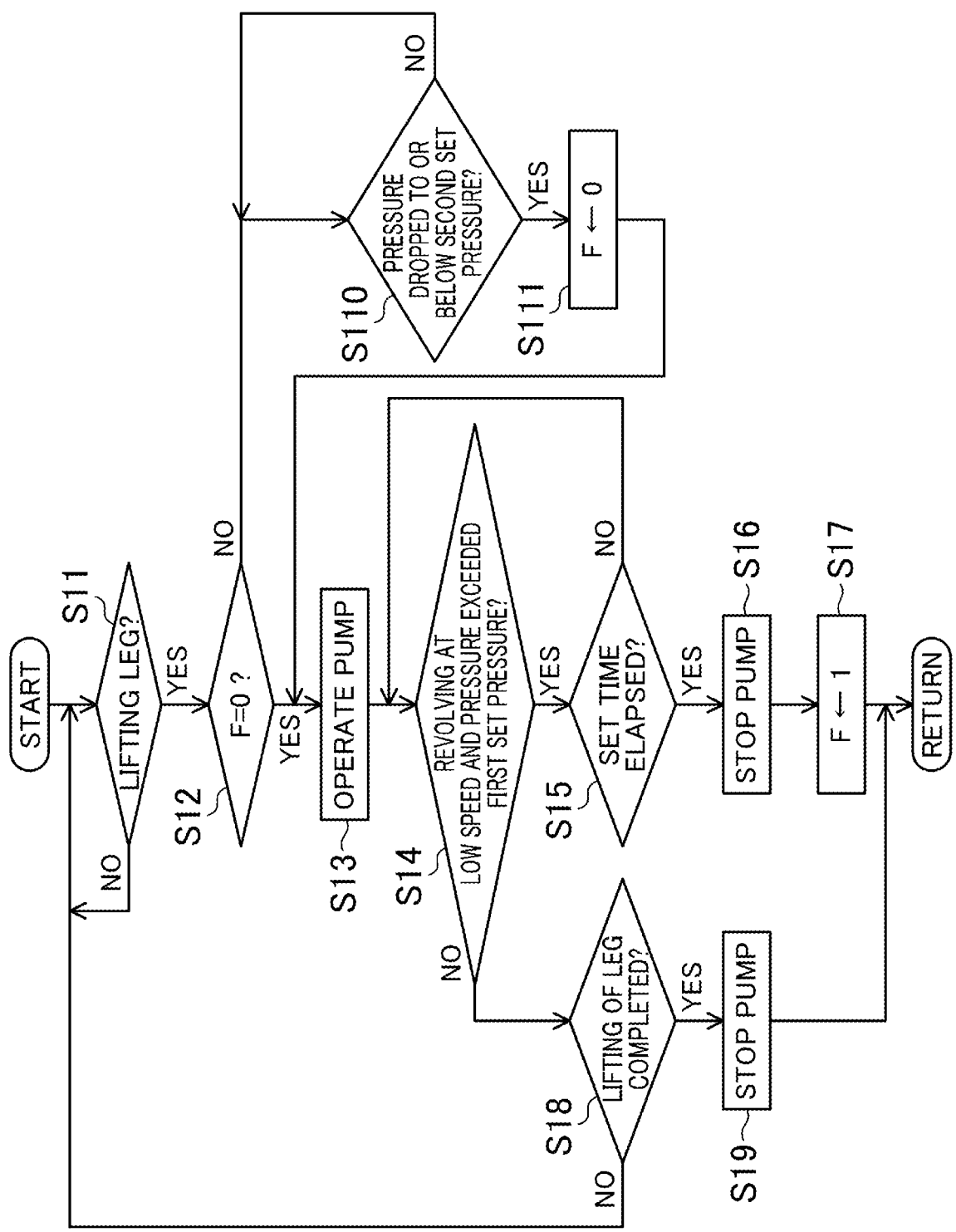
FIG. 4 is a flowchart related to an operation of the EHA system of FIG. 2 lifting the leg.
Figure 5:
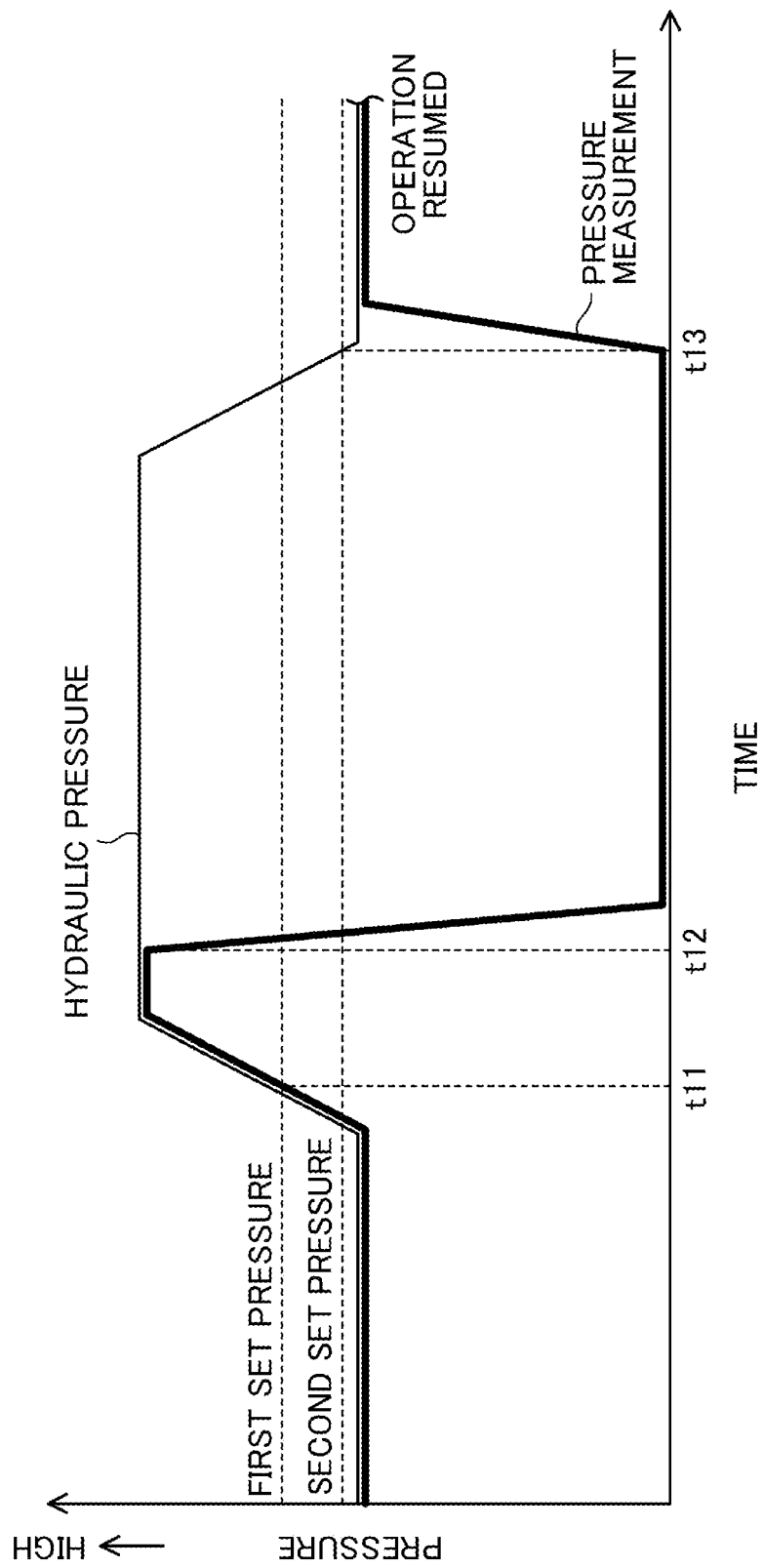
FIG. 5 is a diagram illustrating exemplary changes in the hydraulic pressure of the EHA system and the measured pressure of the pressure sensor.

Next, the above-described control procedure will be described with reference to FIG. 4 and FIG. 5. FIG. 4 is a flowchart showing a control procedure executed by the controller 9 at a time of lifting the leg. FIG. 5 is a diagram showing a change in the hydraulic pressure of the EHA system 10 and a change in the pressure based on the measurement signal from the pressure sensor 38 (i.e., the measured pressure). The continuous line in FIG. 5 indicates a change in the hydraulic pressure of the EHA system 10. The hydraulic pressure of the EHA system 10 can be measured based on the measurement signal of the pressure sensor 39. The bold continuous line in FIG. 5 indicates a change in the measured pressure of the pressure sensor 38. Note that the continuous line and the bold continuous line in FIG. 5 are shifted from each other for the sake of easier viewing.

First, after the start, the controller 9 determines whether lifting of the leg is in progress in step S11. If step S11 results in NO, the process repeats step S11. If step S11 results in YES, the process proceeds to step S12.

In step S12, the controller 9 determines whether a later-described flag F is zero. If the flag F is zero, the process proceeds to step S13. If the flag F is not zero, the process proceeds to step S110. Here, the description continues on assumption that the flag F is zero.

In step S13, the controller 9 operates the first electrically operated hydraulic pump 31 and the second electrically operated hydraulic pump 32. The hydraulic fluid is supplied to the gear cylinder 21 to lift the leg 11. After that, in step S14, the controller 9 determines whether the hydraulic pump 33 is revolving at a low speed not higher than the set revolution speed and whether the hydraulic pressure exceeds the first set pressure. If step S14 results in NO, the process proceeds to step S18. If step S14 results in YES, the process proceeds to step S15. In the example of FIG. 5, the hydraulic pressure exceeds the first set pressure at a time t11.

In step S15, the controller 9 determines whether the state in which the hydraulic pump 33 is revolving at a low speed not higher than the set revolution speed and the hydraulic pressure exceeds the first set pressure continued for a set time. If step S15 results in NO, the process returns to step S14. If step S15 results in YES, the process proceeds to step S16.

In step S16, the controller 9 stops the first electrically operated hydraulic pump 31 and the second electrically operated hydraulic pump 32. In the example of FIG. 5 in which the set time has elapsed at the time t12, the controller 9 stops the first electrically operated hydraulic pump 31 and the second electrically operated hydraulic pump 32. The pressure measured by the pressure sensor 38 becomes substantially zero.

Here, the controller 9 may determine, for the first electrically operated hydraulic pump 31, whether a stop condition related to the determination of steps S15 and S16 is satisfied. Further, apart from the first electrically operated hydraulic pump 31, the controller 9 may determine, for the second electrically operated hydraulic pump 32, whether the stop condition related to the determination of steps S15 and S16 is satisfied. When the stop condition is satisfied for the first electrically operated hydraulic pump 31, the controller 9 stops the first electrically operated hydraulic pump 31. When the stop condition is satisfied for the second electrically operated hydraulic pump 32, the controller 9 stops the second electrically operated hydraulic pump 32. Alternatively, the controller 9 may stop both the first electrically operated hydraulic pump 31 and the second electrically operated hydraulic pump 32 when the stop condition is satisfied for either the first electrically operated hydraulic pump 31 or the second electrically operated hydraulic pump 32.

In the subsequent step S17, the controller 9 sets the flag F to 1. The flag F is a flag indicating that the first electrically operated hydraulic pump 31 and the second electrically operated hydraulic pump 32 are stopped for the purpose of suppressing the risk of seizure taking place during lifting of the leg. The process is then returned.

In step S11 after the return, lifting of the leg is not completed. Step S11 thus results in YES, and the process proceeds to step S12. The flag F is 1, so that step S12 results in NO. The process then proceeds to step S110.

In step S110, the controller 9 determines whether the hydraulic pressure of the EHA system 10 has dropped to or below the second set pressure based on the measurement signal from the pressure sensor 39. If step S110 results in NO, the process returns to step S11. If step S110 results in YES, the process proceeds to step S111.

In step S111, the controller 9 sets the flag F to zero, and the process then proceeds to step S13. The controller 9 resumes the operations of the first electrically operated hydraulic pump 31 and the second electrically operated hydraulic pump. That is, the operation of the electrically operated hydraulic pump 3 is resumed after the hydraulic pressure drops to or below the second set pressure. The controller 9 may immediately resume operation of the electrically operated hydraulic pump 3, or may resume operation of the electrically operated hydraulic pump 3 after a certain interval, after the hydraulic pressure of the EHA system 10 drops to or below the second set pressure.

In the example of FIG. 5, the hydraulic pressure of the EHA system 10 drops to or below the second set pressure, and operations of the first electrically operated hydraulic pump 31 and the second electrically operated hydraulic pump 32 are resumed, at the time t13.

In step S18 during the operation of the electrically operated hydraulic pump 3, the controller 9 determines whether lifting of the leg is completed. The controller 9 can determine that lifting of the leg is completed based on the detection signal of the sensor 310. If step S18 results in NO, the process returns to step S11 to continue lifting of the leg. If step S18 results in YES, the process proceeds to step S19.

In step S19, the controller 9 stops the first electrically operated hydraulic pump 31 and the second electrically operated hydraulic pump 32, and the process is returned.

With this control, the controller 9 stops the electrically operated hydraulic pump 3 if a specific stop condition is satisfied during lifting of the leg, thus suppressing the risk of seizure taking place in the electrically operated hydraulic pump 3. When a specific resume condition is satisfied, the controller 9 resumes the operation of the electrically operated hydraulic pump 3 to resume lifting of the leg, so that lifting of the leg is swiftly completed.

The pressure sensor 39 is attached to the hydraulic path 101 between the hydraulic cylinder 2 and the check valve 35. The controller 9 thus can measure the hydraulic pressure of the hydraulic cylinder 2 even while the electrically operated hydraulic pump 3 is stopped. The controller 9 may resume the operation of the electrically operated hydraulic pump 3 at an appropriate timing.

In the flowchart of FIG. 4, the steps may be rearranged within a possible extent. Some of the steps may be omitted.

(Another Exemplary Configuration of EHA System)

Figure 6:
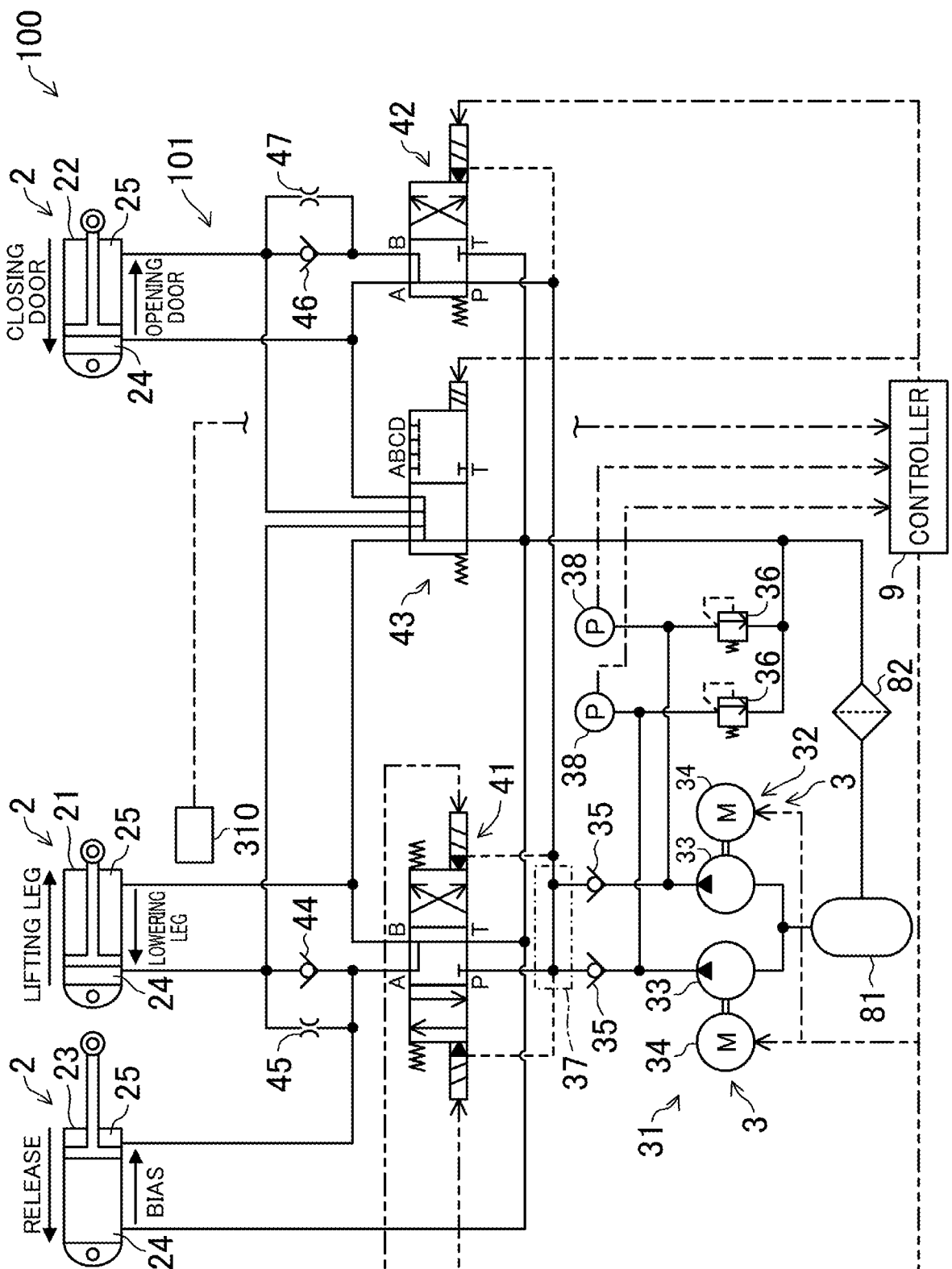
FIG. 6 is a circuit diagram illustrating a landing gear lifting/lowering EHA system different from the one shown in FIG. 2.

FIG. 6 shows a circuit diagram of an EHA system 100 having a configuration different from that of FIG. 2. In the EHA system 100, the pressure sensor 39 is omitted. The same reference characters are given to the configuration elements of the EHA system 100 of FIG. 6, which are identical to those of the EHA system 10 of FIG. 2.

The controller 9 stops the first electrically operated hydraulic pump 31 and the second electrically operated hydraulic pump 32, when a specific stop condition is satisfied during lifting of the leg, similarly to the above-described case. As described hereinabove, the pressure sensors 38 cannot measure the hydraulic pressure of the EHA system 100 while the first electrically operated hydraulic pump 31 and the second electrically operated hydraulic pump 32 are stopped. In view of this, the controller 9 operates temporarily the first electrically operated hydraulic pump 31 or the second electrically operated hydraulic pump 32 while the first electrically operated hydraulic pump 31 and the second electrically operated hydraulic pump 32 are stopped. Operating the first electrically operated hydraulic pump 31 or the second electrically operated hydraulic pump 32 opens the check valve 35, which allows the pressure sensors 38 to output a measurement signal corresponding to the hydraulic pressure of the EHA system 100. Thus, the controller 9 is able to determine whether the hydraulic pressure of the EHA system 100 has dropped to or below the second set pressure, even after the first electrically operated hydraulic pump 31 and the second electrically operated hydraulic pump 32 are stopped.

Here, the operating time of the electrically operated hydraulic pump 3 at a time of measuring the hydraulic pressure of the EHA system 100 is short. Therefore, the risk of seizure taking place in the electrically operated hydraulic pump 3 is suppressed.

Figure 7:
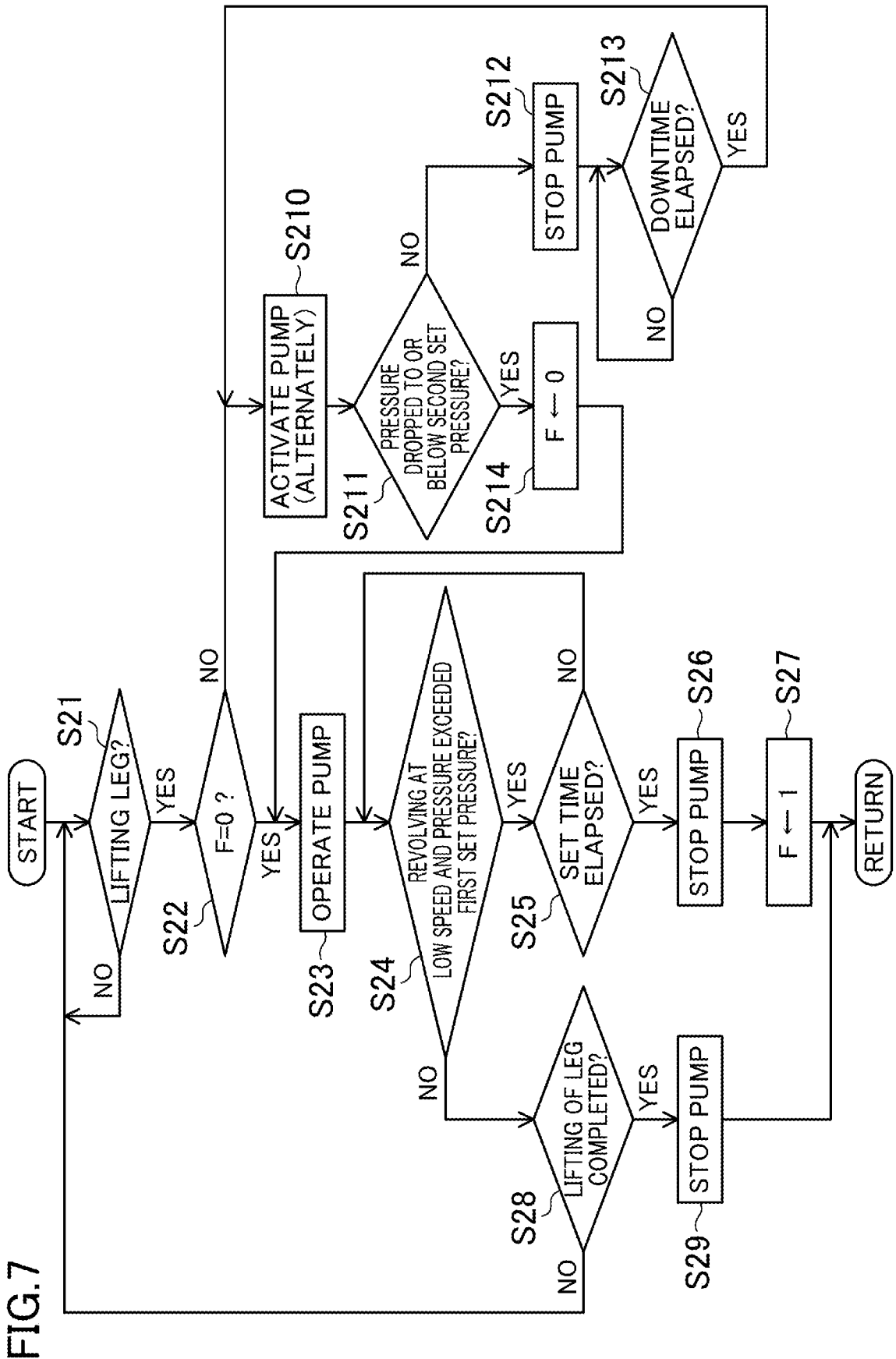
FIG. 7 is a flowchart related to an operation of the EHA system of FIG. 6 lifting the leg.

Next, the above-described control procedure will be described with reference to FIG. 7 and FIG. 8. FIG. 7 is a flowchart showing a control procedure executed by the controller 9 at a time of lifting the leg. FIG. 8 is a diagram illustrating exemplary changes in the hydraulic pressure of the EHA system 100 and a pressure based on the measurement signals from the pressure sensor 38, at a time of lifting the leg. The continuous line in FIG. 8 indicates a change in the hydraulic pressure of the EHA system 100. The bold continuous line in FIG. 8 indicates a change in the measured pressure of the pressure sensor 38.

Steps S21 to S29 of the flowchart of FIG. 7 correspond to steps S1l to 19 of the flowchart of FIG. 5, respectively. When the state in which the revolution speed of the hydraulic pump 33 is not more than the set revolution speed and the hydraulic pressure is over the first set pressure continued for the set time, during lifting of the leg, the controller 9 stops the first electrically operated hydraulic pump 31 and the second electrically operated hydraulic pump 32 (step S26). In the example of FIG. 8, the hydraulic pressure exceeds the first set pressure at the time t21, and the controller 9 stops the first electrically operated hydraulic pump 31 and the second electrically operated hydraulic pump 32 at the time t22.

When lifting of the legs is completed, the controller 9 stops the first electrically operated hydraulic pump 31 and the second electrically operated hydraulic pump 32 (step S29).

After the flag F is set to 1 in step S27, the process proceeds from step S22 to step S210. In step S210, the controller 9 activates the first electrically operated hydraulic pump 31 or the second electrically operated hydraulic pump 32. At this time, the controller 9 activates only one electrically operated hydraulic pump 3 out of the first electrically operated hydraulic pump 31 and the second electrically operated hydraulic pump 32. Operating the electrically operated hydraulic pump 3 opens the check valve 35, which allows the pressure sensors 38 to output measurement signals corresponding to the hydraulic pressure of the EHA system 100.

In step S211 subsequent to step S210, the controller 9 determines whether the measured pressure based on the measurement signals from the pressure sensors 38 is not more than the second set pressure. If step S211 results in NO, the process proceeds to step S212. In step S212, the controller 9 stops the electrically operated hydraulic pump 3 having been activated. The operation of the electrically operated hydraulic pump 3 is temporary. For example, the operating time of the electrically operated hydraulic pump 3 may be about 2 seconds to 3 seconds. Operating the electrically operated hydraulic pump 3 for a short time suppresses the risk of seizure taking place in the electrically operated hydraulic pump 3. In the example of FIG. 8, the electrically operated hydraulic pump 3 is activated at time t23. The measured pressure by the pressure sensor 38 is not equal to or not lower than the second set pressure. The controller 9 thus stops the electrically operated hydraulic pump 3.

After the electrically operated hydraulic pump 3 is stopped, the controller 9 determines whether a preset downtime has elapsed in step S213. The process repeats step S213 until step S213 results in YES. If step S213 results in YES, the process returns to step S210.

In step S210 for the second time, the controller 9 activates the electrically operated hydraulic pump 3 that is different from the previously activated electrically operated hydraulic pump 3. Then, in step S211, the controller 9 determines whether the measured pressures have dropped to or below the second set pressure based on the measurement signals from the pressure sensors 38. In the example of FIG. 8, the controller 9 activates, for the second time, the electrically operated hydraulic pump 3 at time t24. The hydraulic pressure of the EHA system 100 is not yet lowered even at the time of activating the electrically operated hydraulic pump 3 for the second time. The electrically operated hydraulic pump 3 is thus stopped.

The controller 9 intermittently operates the electrically operated hydraulic pump 3 until the measured pressure by the pressure sensors 38 drops to or below the second set pressure. Further, the controller 9 alternately operates the first electrically operated hydraulic pump 31 and the second electrically operated hydraulic pump 32.

By intermittently activating the electrically operated hydraulic pump 3 and measuring the hydraulic pressure of the EHA system 100, the controller 9 can swiftly determine that the hydraulic pressure has dropped. Further, by alternately activating the first electrically operated hydraulic pump 31 and the second electrically operated hydraulic pump 32, the risk of seizure taking place in the first electrically operated hydraulic pump 31 and the second electrically operated hydraulic pump 32 can be suppressed. Further, by alternately activating the first electrically operated hydraulic pump 31 and the second electrically operated hydraulic pump 32, the downtime can be shortened. The downtime may be appropriately set and may be, for example, 1 seconds to 3 seconds. This allows even faster determination of whether the hydraulic pressure of the EHA system 100 has dropped. The operation of the electrically operated hydraulic pump 3 can be resumed earlier. The leg is thus lifted earlier. Note that, activation of the electrically operated hydraulic pump 3 does not have to be alternated. Further, both the first electrically operated hydraulic pump 31 and the second electrically operated hydraulic pump 32 may be temporarily operated.

When the hydraulic pressure of the EHA system 100 drops and step S212 results in YES, the process proceeds to step S215. In step S215, the controller 9 sets the flag F to zero, and the process then proceeds to step S23. The controller 9 operates both the first electrically operated hydraulic pump 31 and the second electrically operated hydraulic pump 32 to resume lifting of the leg. In the example of FIG. 8, the controller 9 activates, for the third time, the electrically operated hydraulic pump 3 at time t25. The measured pressure based on the measurement signals from the pressure sensors 38 dropped to or below the second set pressure. The controller 9 thus resumes the operations of the first electrically operated hydraulic pump 31 and the second electrically operated hydraulic pump 32.

In the flowchart of FIG. 7, the steps may be rearranged within a possible extent. Some of the steps may be omitted.

In the EHA system 100, the pressure sensors 38 measure the hydraulic pressure while the electrically operated hydraulic pump 3 is operated or stopped. Unlike the EHA system 10 of FIG. 2, the number of pressure sensors in the EHA system 100 can be reduced.

Note that the EHA systems 10 and 100 shown in FIG. 2 and FIG. 6 are examples. As the circuit constituting the EHA system for lifting and lowering the legs, an appropriate circuit configuration may be employed.

For example, the EHA systems 10 and 100 described hereinabove are made redundant by having the first electrically operated hydraulic pump 31 and the second electrically operated hydraulic pump 32. Although illustration is omitted, the technique disclosed herein is also applicable to an EHA system for lifting and lowering the leg, which system is not made redundant.

The EHA systems 10 and 100 shown in FIG. 2 and FIG. 6 are each an EHA system of a landing gear 1 on the starboard or the port side of an aircraft. Instead, it is possible to apply the technique disclosed herein to an EHA system for a combination of a landing gear on the starboard and a landing gear on the port side of an aircraft. Although illustration is omitted, such an EHA system for a combination of a starboard landing gear and a port side landing gear may be configured such that, for example, a hydraulic path at the downstream of a selector valve is branched into a pathway to the starboard landing gear and a pathway to the port side landing gear so that the first electrically operated hydraulic pump 31 and the second electrically operated hydraulic pump 32 supply the hydraulic fluid to the hydraulic cylinders 2 of the starboard landing gear and to the hydraulic cylinders 2 of the port side landing gear.

Further, in the above description, the control target is the gear cylinder 21. However, the technique disclosed herein may be applied with the door cylinder 22 as the control target.

The invention claimed is:

1. A landing gear lifting/lowering EHA system, comprising:
   a hydraulic actuator attached to a leg of an aircraft and configured to lift and lower the leg;
   at least one electrically operated hydraulic pump configured to supply a hydraulic fluid to the hydraulic actuator at a time of lifting or lowering the leg;
   a hydraulic path connecting the hydraulic actuator and the electrically operated hydraulic pump;
   a pressure sensor attached to the hydraulic actuator or the hydraulic path and configured to output a measurement signal corresponding to a hydraulic pressure; and
   a control unit configured to receive the measurement signal and output, to the electrically operated hydraulic pump, a control signal based on the hydraulic pressure, wherein
   when a state in which the hydraulic pressure exceeds a set pressure continues for a set time while the leg is being lifted, the control unit stops the electrically operated hydraulic pump in operation and resumes the operation of the electrically operated hydraulic pump after the hydraulic pressure drops to or below a second set pressure after the electrically operated hydraulic pump is stopped.

2. The landing gear lifting/lowering EHA system of claim 1, wherein
   the control unit stops the electrically operated hydraulic pump in operation when a state in which the revolution speed of the electrically operated hydraulic pump is not more than a set revolution speed and the hydraulic pressure exceeds a set pressure continues for the set time.

3. The landing gear lifting/lowering EHA system of claim 1, further comprising
   a check valve arranged in the hydraulic path and configured to stop backflow of the hydraulic fluid to the electrically operated hydraulic pump.

4. The landing gear lifting/lowering EHA system of claim 3, wherein
   the pressure sensor is arranged at the hydraulic actuator or between the hydraulic actuator and the check valve, and
   while the electrically operated hydraulic pump is stopped, the control unit determines that the hydraulic pressure has dropped to or below the second set pressure based on the measurement signal.

5. The landing gear lifting/lowering EHA system of claim 3, wherein
   the pressure sensor is arranged between the check valve and the electrically operated hydraulic pump, and
   while the electrically operated hydraulic pump is stopped, the control unit temporarily operates the electrically operated hydraulic pump and determines that the hydraulic pressure has dropped to or below the second set pressure based on the measurement signal obtained while the electrically operated hydraulic pump is temporarily operated.

6. The landing gear lifting/lowering EHA system of claim 5, wherein
   the control unit intermittently repeats temporary operation of the electrically operated hydraulic pump until the hydraulic pressure drops to or below the second set pressure.

7. The landing gear lifting/lowering EHA system of claim 1, wherein
   the electrically operated hydraulic pump includes a first electrically operated hydraulic pump and a second electrically operated hydraulic pump,
   the hydraulic path connects the first electrically operated hydraulic pump and the second electrically operated hydraulic pump in parallel with the hydraulic actuator,
   in the hydraulic path, a check valve is arranged between a merging point of the first electrically operated hydraulic pump and the second electrically operated hydraulic pump and the first electrically operated hydraulic pump, and a second check valve is arranged between the merging point and the second electrically operated hydraulic pump, and
   while the leg is being lifted or lowered, the control unit operates both or one of the first electrically operated hydraulic pump and the second electrically operated hydraulic pump.

8. The landing gear lifting/lowering EHA system of claim 7, wherein
   the pressure sensor is arranged at the hydraulic actuator or between the hydraulic actuator and the merging point, second pressure sensors are arranged between the first electrically operated hydraulic pump and the check valve and between the second electrically operated hydraulic pump and the second check valve, respectively, and while the electrically operated hydraulic pump is operated, the control unit determines that the hydraulic pressure has exceeded the set pressure based on measurement signals from the second pressure sensors, and while the electrically operated hydraulic pump is stopped, the control unit determines that the hydraulic pressure has dropped to or below the second set pressure based on the measurement signal of the pressure sensor.

9. The landing gear lifting/lowering EHA system of claim 7, the pressure sensors are arranged between the first electrically operated hydraulic pump and the check valve and between the second electrically operated hydraulic pump and the second check valve, respectively, and while the electrically operated hydraulic pump is operated, the control unit determines that the hydraulic pressure has exceeded the set pressure based on the measurement signal, and while the electrically operated hydraulic pump is stopped, the control unit temporarily operates the electrically operated hydraulic pump and determines that the hydraulic pressure has dropped to or below the second set pressure based on the measurement signal obtained while the electrically operated hydraulic pump is temporarily operated.

10. The landing gear lifting/lowering EHA system of claim 9, wherein:

the control unit intermittently repeats temporary operation of the electrically operated hydraulic pump until the hydraulic pressure drops to or below the second set pressure, and the control unit alternately and temporarily operates the first electrically operated hydraulic pump and the second electrically operated hydraulic pump.

* * * * *